Oct. 15, 1929.  C. M. GOTTSCHAU  1,731,490
UNWINDING, FEEDING, AND WINDING MECHANISM
Filed April 25, 1923  4 Sheets-Sheet 1

INVENTOR
Christian M. Gottschau
BY
Chester W. Brazel
ATTORNEY

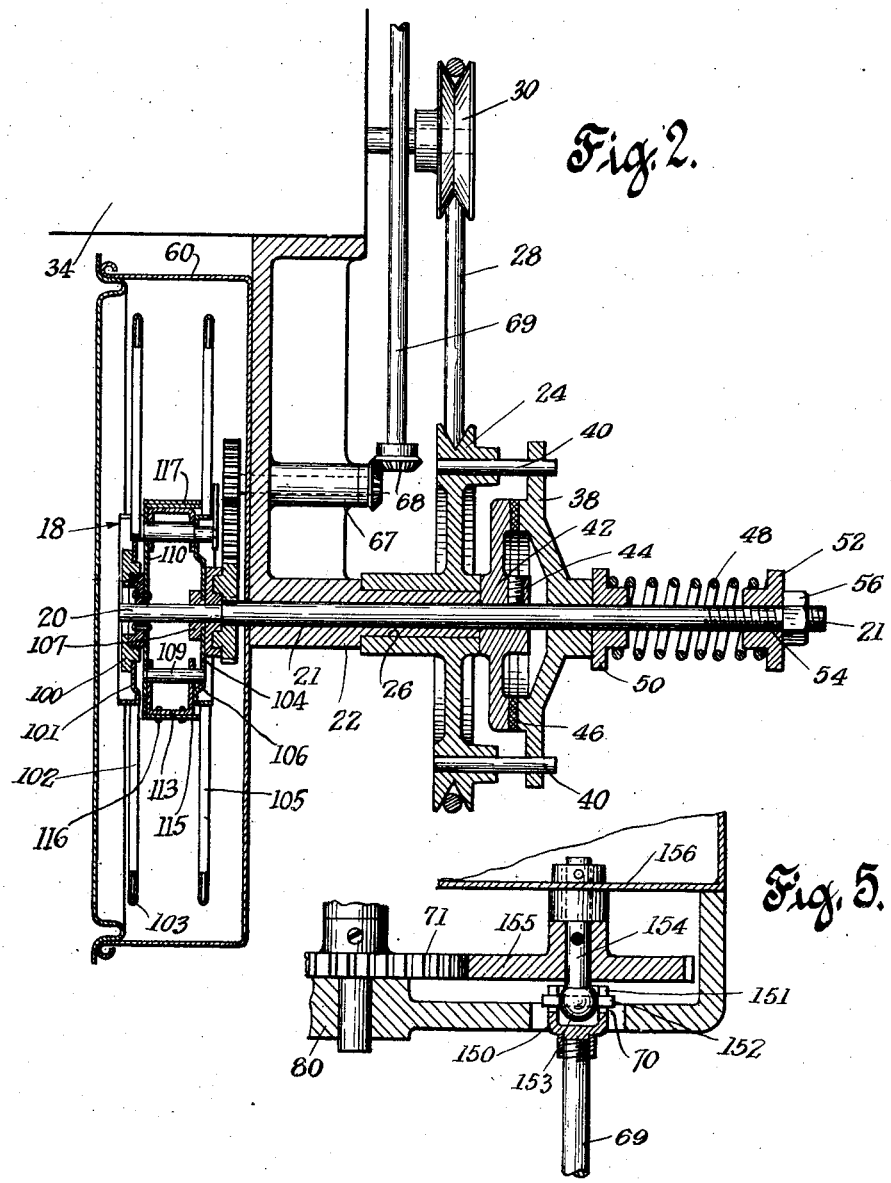

Oct. 15, 1929.   C. M. GOTTSCHAU   1,731,490
UNWINDING, FEEDING, AND WINDING MECHANISM
Filed April 25, 1923   4 Sheets-Sheet 3
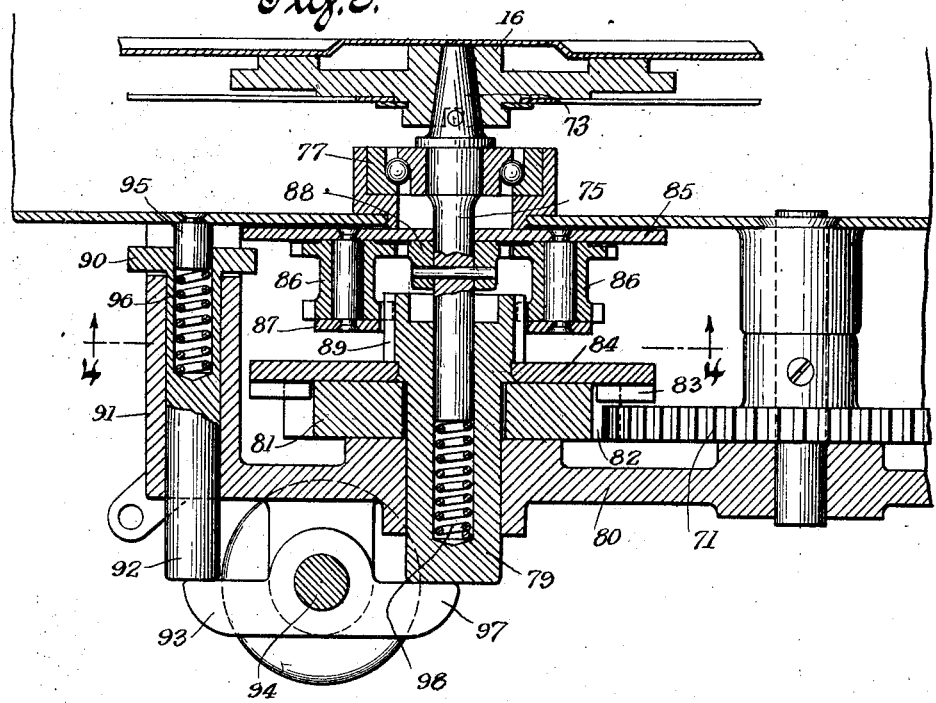
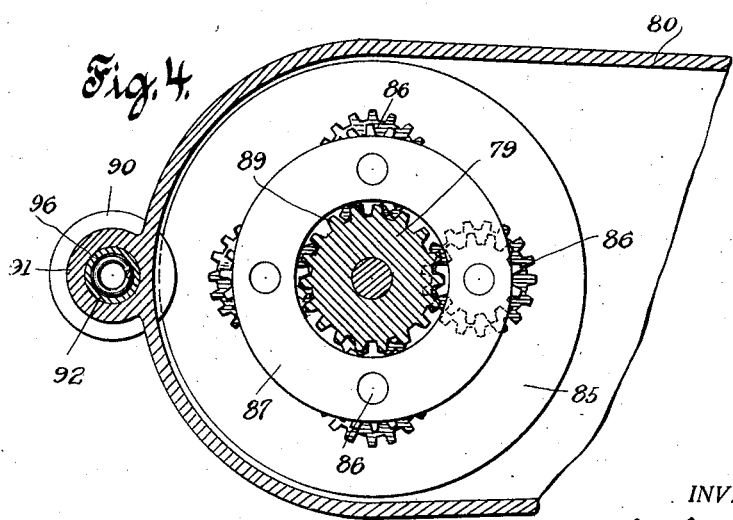
INVENTOR
Christian M. Gottschau
BY
ATTORNEY

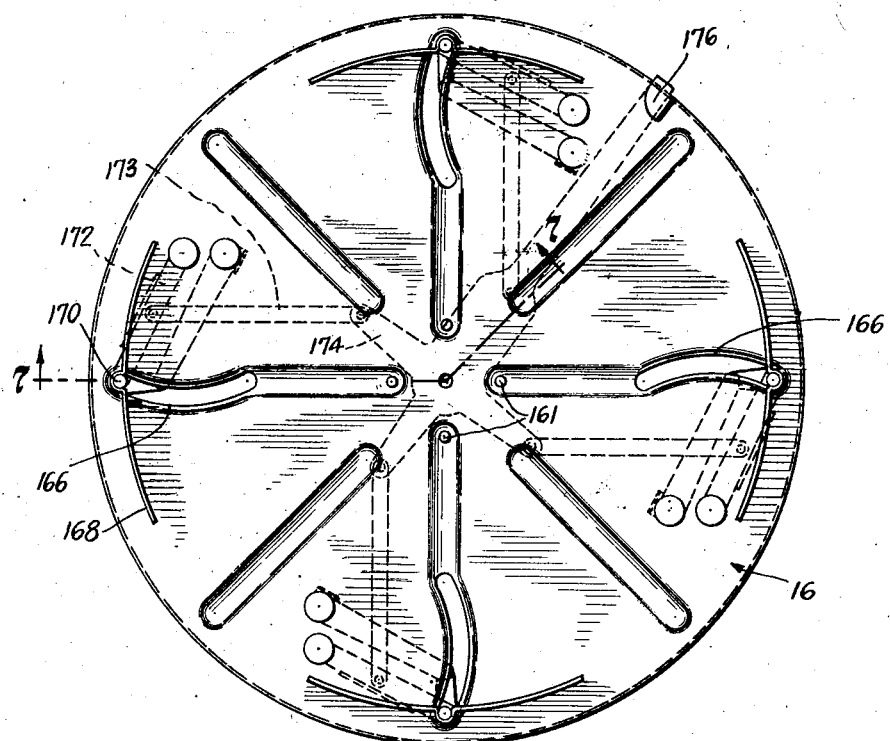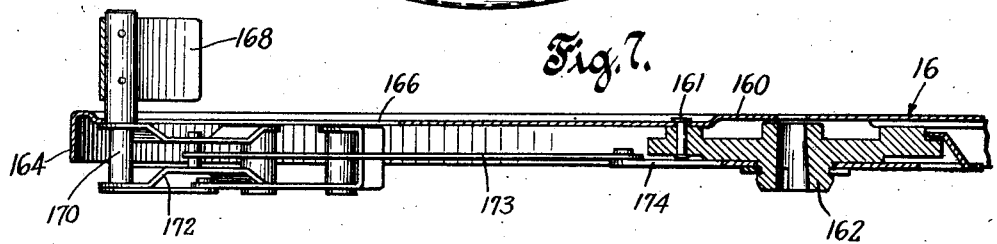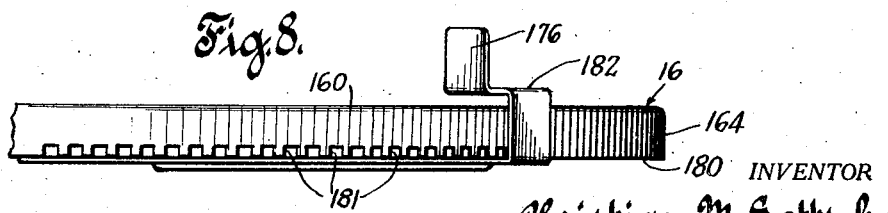

Patented Oct. 15, 1929

1,731,490

UNITED STATES PATENT OFFICE

CHRISTIAN M. GOTTSCHAU, OF PHILADELPHIA, PENNSYLVANIA, ASSIGNOR, BY MESNE ASSIGNMENTS, TO PICTURE MACHINE SERVICE CORPORATION, OF DENVER, COLORADO

UNWINDING, FEEDING, AND WINDING MECHANISM

Application filed April 25, 1923. Serial No. 634,474.

The present invention is a continuation in part of my co-pending application entitled "Reeling apparatus," Serial No. 524,189, filed December 22nd, 1921, and relates to a strip unwinding, feeding and winding mechanism, particularly adaptable to moving picture projection apparatus or cameras and other mechanism such as piano player roll winding apparatus, the mechanism forming a particularly useful combination with that type of motion picture projection apparatus arranged to unwind, feed, and spirally wind a film in such a manner as to locate a point, such as the beginning of the film, in position on the wound up film to unwind again in the same manner with the proper sequence of pictures as before without necessitating a rewinding of the film in order to permit a second use of the same. In the particular motion-picture art, whether rewinding is eliminated or not, as it is desired to feed the film past the projecting apparatus at a uniform speed, it is necessary to provide for a variation in the rotating speeds of the unwinding and winding supports due to the continually changing diameters of the film reels as the film is unwound from the one and wound upon the other. Moreover, in this connection, the variable speeds of the unwinding and winding reels while being substantially the same, must differ one from the other by a certain amount because of that portion of the strip which is located in the mechanism between the reels. In addition to this, I have discovered that it is highly desirable to provide means for varying the speed ratio of the unwinding and winding reels to compensate for lack of uniform tension on the film or for varying climatic conditions which affect the film or for variation in thickness of the film throughout the entire length thereof and it is an object of the present invention to provide means to vary the speed ratio of the unwinding and winding supports or reels in any mechanism in which a strip is unwound from its spirally wound roll on one reel or plate and spirally wound on another reel in order to compensate for the aforesaid and other variations.

A further object of the present invention is to provide such a mechanism in a structure in which a rewinding is eliminated by arranging a mechanism to spirally wind a strip from one reel on another and locate a point such as the beginning of the strip in substantially the same relative position on the wound up reel as it had in the reel of the strip before unwinding.

Another object of the present invention is to provide a mechanism of this character in which the speed of the unwinding and winding reels also has sufficient difference as to normally compensate for the amount of the strip taken up in the apparatus in which the mechanism is used.

A further object of the present invention is to provide an entire combination with a construction for feeding a strip in any desired apparatus at a constant speed, for unwinding the strip from a spirally wound roll at a varying speed to compensate for variations in diameter of the reel as the film is unwound, for winding the same in a similar manner as wound and for providing means to vary the speed ratio of the reel during the operation of the mechanism.

A further object of the present invention is to provide a mechanism of the character indicated, in which the strip is unwound from the central portion of the spirally wound film and rewound upon a central portion outwardly with means for varying the relative speeds of the unwinding and winding reels.

A further object of the present invention is to provide a type of winding reel which permits the hub thereof to be removed when the film wound thereon is to be inserted upon the unwinding reel so that the film may be unwound from the center portion thereof.

A further object of the present invention is to provide in a mechanism for unwinding a strip, feeding the same through suitable mechanism and thereupon rewinding the same, means to adjust the position of the unwinding reel with means connected therewith for maintaining the proper driving means irrespective of the angle of adjustment of the mechanism, and a further object is to entirely enclose the film as the same is fed.

Various other objects are within the scope of this invention such as relate to the arrangement of the related elements of the structure, to various details of construction, to economies of manufacture, and to each of the other features of novelty as will appear from a consideration of the details of the drawing and related description of a certain form of the invention which may be preferred, in which drawings:

Figure 1 is an elevational view partly in section of the present invention for moving picture projecting apparatus;

Figure 1ª is a detail of the winding reel center;

Figure 2 is a vertical sectional view of the winding reel and driving mechanism therefor;

Figure 3 is a transverse vertical section of the driving mechanism for the unwinding turn table showing one embodiment of means for varying the relative speeds of the unwinding turn table or reel and the winding reel;

Figure 4 is a sectional view taken on the line 4—4 of Figure 3;

Figure 5 is a sectional view of the driving connection permitting angular adjustment of the upper turn table;

Figure 6 is a plan view of the adjustable reel retaining upper turn table; Figure 7 is a section thereof on the line 7—7 of Figure 6, and Figure 8 is a detail of the adjustment retaining means.

While the present invention has a large variety of uses indicated above and others as will appear to those skilled in the art, yet it is illustrated herein as embodied in a moving picture projecting apparatus which constitutes an improvement of my co-pending application above referred to.

Figure 1:
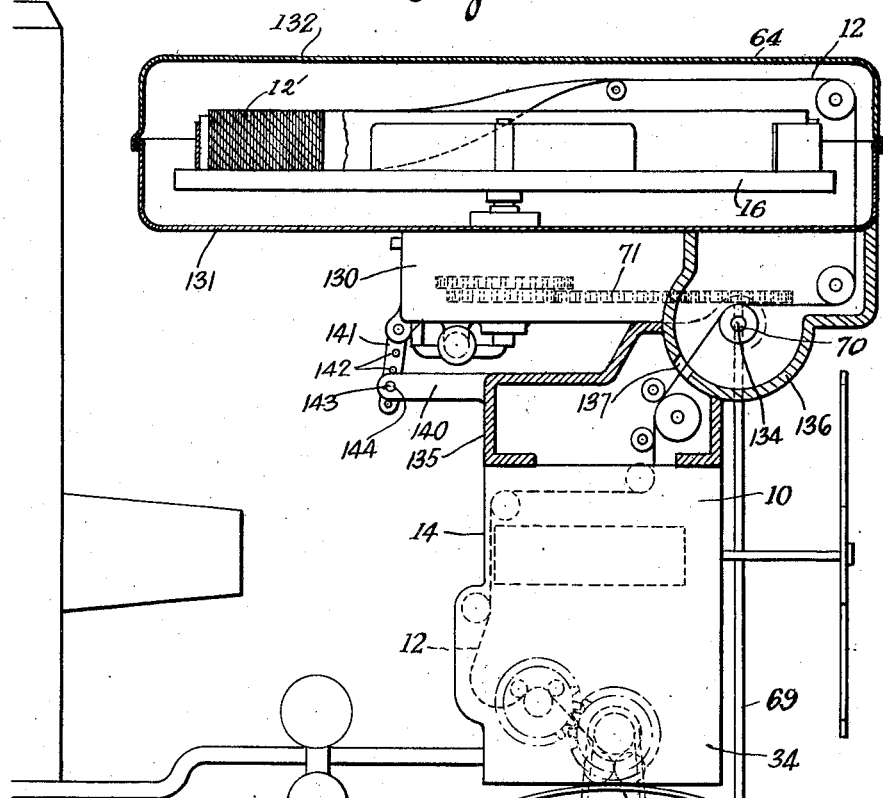
Figure 1A:
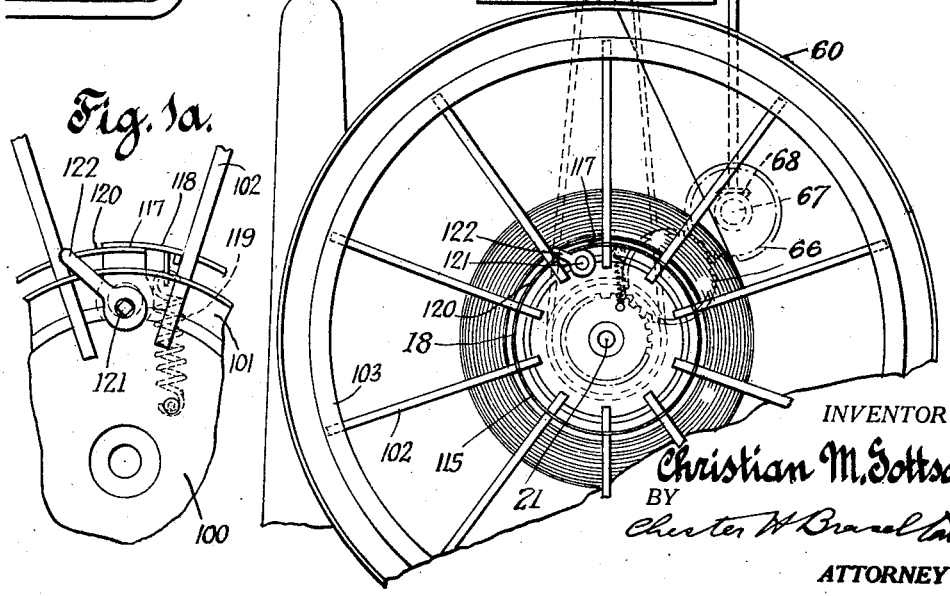

Thus there is illustrated in Figure 1 a feeding mechanism 10 for moving picture film 12 adapted to be fed at fixed intervals at a constant velocity past a suitable opening 14 through which light projects to cause the film to be reproduced on the screen as will be understood by those skilled in the art. The film 12 is unwound from the unwinding reel plate or turn table 16 and rewound on the reel 18 since the film passes the opening 14 at a fixed velocity and is spirally wound in a coil on the reel 18. It will be seen that in order to maintain a desired linear speed of the film on the reel corresponding to that of the feeding mechanism 10, it will be necessary to diminish the speed of the reel 18 as the film 12 is wound thereon.

In Figure 2 a suitable mechanism for accomplishing this end is illustrated, wherein the reel 18 is mounted on the shaft 20 supported in the bearing 21 of the bracket 22 and adapted to be driven through a slip clutch arrangement from the driving pulley 24 which may likewise be mounted on the bearing 26 on the bracket 22 and driven by a belt 28 from the pulley 30 which in turn is rotated by a motor preferably located within the casing 34 for the feeding mechanism. A suitable slip clutch which may likewise form means whereby the tension with which the film 12 is wound on the reel 18 may be varied consists in providing a clutch disc 38 connected by pins 40 to be positively driven by the pulley 24 and providing the shaft 21 with a driving disc 42 suitably secured thereto as by the set screw 44. It is desirable to provide the disc 42 with a leather friction ring 46. The tension of the driving connection through the friction clutch 42 may be determined by a spring 48 bearing between a collar 50 abutting the hub of the clutch disc 38 on one end and a collar 52 screw-threaded at 54 on the end of the shaft 21. The position of the collar 52 may be adjusted as desired and locked in adjusted position by the lock nut 56, as will be understood by those skilled in the art.

Any suitable driving connection between the reel 18 and the shaft 20 which may permit the reel 18 with the film when wound thereon to be bodily removed therefrom, may be employed. The film is provided with perforations which engage in teeth in sprocket wheels in the feeding mechanism to thus form a positive engagement with the feeding mechanism 10 operating at a constant velocity as stated. It therefore follows that the film 12 follows and enters the feeding mechanism at a constant velocity. From a discharge sprocket the film enters the lower magazine or casing 60 for winding upon the reel 18. With each successive rotation of this reel, as heretofore suggested, the diameter increases, the amount being equal to twice the thickness of the film, a moving picture film being usually regarded as .008 of an inch in thickness so that with each turn of the film on the reel, the diameter increases .016 of an inch. The speed of the reel 18, when empty, is usually slightly more than that at which the film 12 comes from the discharge sprocket of the feeding mechanism. As the film 12 is wound into the roll on the reel 18 and the same increases in diameter, the film will thus have a retarding influence upon the receiving reel and cause a constant slippage to take place in the friction clutch 38. The tension with which the film becomes wound on the reel is determined by the amount of torque given the clutch through the spring 48, it being desirable to reduce this tension as much as possible to avoid tearing the film in the sprocket holes and in the joints.

As heretofore indicated, the film 12 is to be delivered to the feeding mechanism from a roll located in the reel or plate or turn table 16 in the upper magazine 64 and as the diameter of the roll varies with the feeding of the film, in order to maintain a constant linear velocity of the film to the feeding mechanism it will be apparent that it will be desirable to likewise drive the upper turn table 16 at a constantly varying rate of speed.

The present invention is shown applied to that type of unwinding, feeding and winding mechanism in which a certain portion of the film is unwound, fed and rewound in such a manner as to permit of reuse of the film without an intermediate rewinding thereof. The turn table 16 is driven with a constantly diminishing velocity the same as the reel 18 (at a reduced speed as will hereinafter appear). I provide a driving connection from the shaft 21 to the turn table 16 through the medium of the train of gear 66, shaft 67 (see Figures 1 and 2) bevel gears 68, vertical shaft 69, universal joint 70 and the gear train 71 located in the lower portion of the upper magazine 64. The gear train 71 is adapted to drive the turn table 16 through a mechanism permitting a variation of the speed thereof with respect to the reel 18, as will hereinafter appear. As explained in my co-pending application heretofore referred to, in view of the fact that a certain number of feet of film is required in passing from the unwinding film to the winding reel 18, the speed of the turn table 16 is somewhat less than the speed of the receiving reel 18. It has been found in practice that this speed ratio should normally be 996½ to 100 and the train of gears 66 and 71 is made to reduce the speed this amount.

As heretofore stated, an essential object of the present invention is to provide means whereby the relative speeds of the unwinding reel, plate or turn table and the winding reel may be varied to compensate for variations caused by change of tension, varying climatic conditions and an actual variation in the thickness of various parts of the film throughout its length. An efficient mechanism for this purpose is provided as shown in Figures 3 and 4 between the gear train 71 and the turn table 16. The turn table 16 is mounted on the taper end 73 of the turn table shaft 75, which is supported in a ball bearing 77 capable of receiving both lateral and end thrusts. The lower end of the shaft 75 is guided in the hollow stem or gear shaft 79. The gear box 80 supports the gear 71 and its shaft, as shown, and likewise carries the gear 81 which is driven from the gear 71. This gear 81 is loose on the shaft 79 and is thicker than the gear 71, so that the teeth 82 may engage both the teeth of the gear 71 and the internal gear teeth on the ring 83 carried by the plate 84 which is secured to the shaft 79. The power is transmitted from the gear shaft 79 to the turn table spindle 75 through the medium of a planetary gear transmission whereby the speed of the turn table spindle may be retarded, accelerated or driven at the same speed as the speed of the gear 83 with the plate 84 to which it is attached and consequently the hollow shaft 79. This planetary gear system includes an upper plate 85, planetary pinions 86 and the lower plate 87. The gear 88 is permanently secured to the turn table spindle 75 and is in continuous mesh with the planetary pinions. Likewise, the toothed end 89 of the gear shaft 79 is in constant mesh with the planetary pinions 86. Means are provided to apply a braking action to the planetary gear-carrier 85 in the form of a plunger 90 suitably supported in a bearing 91 in the gear box 80, the lower end of the stem 92 of which projects downwardly into close proximity to an oscillating arm 93 connected to the transverse shaft 94 to be operated thereby. The upper end of the plunger 90 is made hollow and is guided on the stud 95, there being a spring 96 between the stud 95 and the bottom hollow portion of the plunger to maintain the same normally out of contact with the carrier plate 85. An arm 97 bears on the lower end of the hollow shaft 79 and may be made integral with the arm 93 as clearly shown in Figure 3. A spring 98 is located between the lower end of the turn table spindle 75 and the bottom of the hollow shaft 79 as shown for the purpose of normally maintaining the shaft 79 and the gears carried thereby in mesh with the driving gear 81, as will hereinafter appear.

In view of the fact that the present invention contemplates an arrangement in which rewinding is eliminated and in the specific illustration the construction provides for withdrawing the film from the center in unwinding from the turn table 16, I have provided a removable winding reel 18 with a collapsible hub to facilitate the application of the film on the turn table 16 for use thereof in the apparatus after the same has been previously wound on the reel 18 in the same machine or in some other machine from which the film is received.

Referring to Figure 2, it will be seen that the shaft 20 has a drivingly mounted removable hub member 100 to which is secured a plate 101 having a plurality of radial spokes 102 connected at the periphery by a strip 103 U-shaped. To form the rear guide 104 for the film as the same winds upon the reel 18 the winding reel 18 carries a similar complementary outside frame 105, the inner ends of the spokes of which are secured to a plate 106 having a central member attached to bearing member 107 for receiving the shaft 20. The shaft openings in hub members 100 and 107, or either of them, may be of non-circular form by which means the shaft may drive the hub as will be understood by those skilled in the art. To the plate 106 is riveted a plurality of transverse studs 109 which are likewise riveted to the side plate 110 of the hub. A circular channel shaped member 113 is secured to the transverse studs 109 with the channel portions thereof in contact with plates 106 and 110.

The collapsible portion of the hub is formed by providing a spring band 115 riveted to the channel member 113 at the bottom portion thereof as indicated in Figure 2 by the rivets 116, the opposite ends thereof overlapping, as shown at 117. (See Figure 1ª.) One of the free ends 118 of the band 115 is normally drawn toward the center of the hub by a spring 119, while the other end 120 is connected to an eccentric 121 provided with a handle 122, so that as the handle is turned clockwise, as is shown in Figure 1ª, the end 120 moves therewith and the end 118 will move inwardly by reason of the spring 119 until the handle 122 contacts with the rim 113, thus collapsing the periphery of the hub or reducing the diameter sufficiently to permit of the removal of the film roll after the guide members 100—103 have been removed from the shaft by first unscrewing the removable hub member 100.

As the film is to be unwound from the center, I have provided means for supporting films of various diameters at their peripheries on the upper turn table 16. Referring to Figures 6, 7 and 8, the turn table 16 may consist of a sheet metal disc 160 riveted as at 161 to a central mounting 162 connected to and driven with the turn table spindle 75. The disc 160 has a flange 164 and a plurality of curved slots 166. Resting on the top of the disc 160 are a plurality of curved film retaining movable members 168, carried by pins 170 as shown which extend downwardly through the slots 166 in the disc 160. Means is provided for simultaneously adjusting the several curved plates 168 to retain the rolls of films of different diameters. Thus, the pins 170 are connected to parallel link members 172, each connected with links 173 to a central star plate 174, suitably supported on the hub 162. An operating handle 176, of sheet metal, which may be integral with the star plate extends outwardly beyond the edge of the disc 160 and may be sprung upwardly to cause engagement of an upturned portion thereof with any one of several notches 181 cut in the rim of disc 160. A finger piece 182 on the handle 176 may be used to depress the handle out of engagement of the notches 181 and by swinging the same the members 168 are moved inward to engage the periphery of a film roll, after the same has been placed on the turn table and locked in position by the engagement of the lug in the proper notch 181.

As heretofore indicated, the present invention also has for an object an adjustable mounting and driving connection for the turn table 16 and to this end I have provided a gear box and support 130 carrying a casing 131 which is provided with suitable windows 132 so that the operator may observe the film in action. The gear box 130 is attached at 134 to a support 135 which is in turn attached to the upper part of the mechanism. A feature of the invention also includes means whereby the film passing from the gear box 130 to the feeding mechanism 14 will always be enclosed regardless of the adjustment of the gear box and turn table 16 so that I provide a curved portion 136 on the gear box 130, the center of which is the pivot 134. This curved portion is provided with an opening 137 to permit the film to pass therethrough, the position of the opening being such relative to the pivot 134 that the film therethrough is at all times free regardless of the positions of adjustment of the gear box and turn table relative to the support within the limits of the design of the particular apparatus. The support 135 has an arm 140, while the gear box 130 has a pivoted link 141 provided with a series of holes 142 for various adjustments with respect to an opening 143 in the forked end of the arm 140. A pin 144 secures the link 141 in various positions of adjustment so that it will be seen that the casing 130 may be swung about the pivot 134 and held in various positions of adjustment by the link 141.

In order to provide for an uninterrupted driving connection irrespective of the position of adjustment of the turn table 16, I have provided a universal driving connection from the shaft 69 to the gear train 71 as indicated at 70, the same being in alignment with the pivot 134 for the gear box 130. Referring to Figure 5, a detailed construction for the universal joint 70 is shown in the cup-shaped member 150 secured to the shaft 69 and provided with notches 151 to receive the arms 152 carried by the balled end 153 of the shaft 154 to the first gear 155 of the gear train 71. The shaft 154 and its gear 155 are hung from a transverse plate 156 as will be evident from an inspection of Figure 5.

*Operation*

A roll of the film 12 is placed on the turn table 16 after the same has been removed from a machine with the reel 18 and guide frame portion 105 attached therewith. The cam handle 122 is moved clock-wise to collapse the hub whereupon the reel 18 and frame 105 are simultaneously removed from the film. The inner end of the film is then threaded over and through the suitable rollers to the feeding mechanism 14, the discharge sprocket, and on to the receiving or winding reel 18. The power is turned on and the motor drives the shaft 21 through the slip clutch 38 in the manner heretofore indicated, the clutch slipping as the diameter of the wound up film on the reel 18 increases to constantly diminish the speed of the reel. The gear connections from the shaft 21 through the vertical shaft 69, train of gears 71 and planetary transmission to the turn table spindle 75, drives the unwinding turn table reel or plate in such a manner that the speed will likewise vary as the diameter of the removed film varies since the friction clutch or slipping drive 38 is located between the source of power 32 and the connection to the upper magazine. The operator can observe the action of the unwinding reel through the windows in the casing 131 and as the tension of the same will be indicated in the manner in which the film leaves the convolutions of the roll he may turn the handle of the shaft 94 in one direction or the other to increase or decrease the speed of the turn table 16. By turning the shaft 94 counter-clockwise the arm 97 will raise the shaft 79 and consequently the gear 83 out of driving connection with the gear train 71 and the speed of the turn table 16 will diminish due to friction to an amount dependent upon the time which the operator holds the gear connections broken. If the operator desires to increase the speed ratio of the unwinding table or reel 16 and the wind reel 18, the shaft 94 is turned clockwise or in the opposite direction whereupon the arm 93 raises the plunger 92 with the braking plate 90 moving into contact with the brake element 85 of the planetary gear transmission. As the size of the planetary gears 86 on each end thereof vary, it will be understood by those skilled in the art that the sun gear 88 connected to the turn table spindle 75 will now be driven at increased speed.

When the operator releases his torque upon the handle of the shaft 94, the spring 98 in one case and the spring 96 in the other case returns the parts to normal position as will be readily seen.

The further manipulations of the apparatus described with respect to the adjustment of the turn table 16 to the horizontal on the pivot 134 and the manipulation of the collapsible hub 18, requires, in view of the foregoing description of the mechanism and structure, no further enlargement as to their possibilities and proper use.

It is to be understood that various other means could be employed for getting the gear reduction of the required amount between the speed of the winding reel 18 and the unwinding reel 16. It is likewise apparent that either constructions for increasing or decreasing the speed of either the turn table 16 or the reel 18, one relative to the other, should be employed and that the control of the same can be manually operated or automatically operated, depending upon the use to which the apparatus be put.

It is apparent that within the spirit of the invention modifications and different arrangements may be made other than as herein disclosed, and the present disclosure is illustrative merely, the invention comprehending all variations illustrated.

Having thus described my invention what I desire to secure by Letters Patent and claim is:

1. Apparatus of the type described, which comprises an unwinding strip support permitting unwinding a strip from the interior of a roll; a winding support; driving means for one of said supports; transmission means for rotating said unwinding strip support in a definite relation to the rotation of the winding support; and means for progressively modifying in either direction the speed ratio through said transmission means.

2. Apparatus of the type described, which comprises an unwinding strip support permitting unwinding a strip from the interior of a roll; a winding support; driving means for one of said supports; transmission means for rotating said unwinding strip support in a definite relation to the rotation of the winding support; means for disconnecting the speed transmission through said transmission means; and means for increasing the speed ratio through said transmission means.

3. Apparatus of the type described, which comprises an unwinding strip support permitting unwinding a strip from the interior of a roll; a winding support; driving means for one of said supports; transmission means for rotating said unwinding strip support in a definite relation to the rotation of the winding support; and means movable in one direction to disconnect transmitting elements in said transmission means and movable in the opposite direction to modify the speed ratio through said transmission means.

4. Apparatus of the type described, which comprises an unwinding strip support permitting unwinding a strip from the interior of a roll; a winding support; driving means for said winding support; transmission means for driving said unwinding strip support from said driving means in a definite relation to that of the winding support; manually operable means for modifying the speed ratio through said transmission means; and means for returning the speed ratio through said transmission means to normal upon release of said manually operable means.

5. Apparatus of the type described, which comprises an unwinding strip support permitting unwinding a strip from the interior of a roll; a winding support; driving means for said winding support; transmission means for driving said unwinding strip support from said driving means in a definite relation to the speed of said winding support; manually operable means for gradually increasing the speed ratio through said transmission means in gradually progressive stages; and means for returning said speed ratio to normal upon release of said manually operable means.

6. Apparatus of the type described, which comprises an unwinding strip support permitting unwinding a strip from the interior of a roll; a winding support; driving means for said winding support; transmission means for driving said unwinding strip support from said driving means in a definite relation to the speed of said winding support; a modifying means manually actuable to progressively vary the speed ratio through said transmission means; and resilient means for normally holding said modifying means out of actuating position.

7. Apparatus of the type described, which comprises an unwinding strip support permitting unwinding a strip from the interior of a roll; a winding support; driving means for said winding support; transmission means for driving said unwinding strip support from said driving means in a definite relation to the speed of said winding support; means for disconnecting the transmission through said transmission means; a modifying means actuable to increase the speed ratio to continuously progressive stages; and an actuating means movable in opposite directions to operate one or the other of said modifying or said disconnecting means, and resiliently returning to nonactuating position upon release.

8. In combination, an unwinding spirally coiled strip support, a winding support, means to drive both said supports and means to vary the relative speeds of one with respect to the other, comprising a disengageable driving connection in the driving means for one of said supports, a planetary gear set in the driving means for one of said supports, and means to cause a speed variation in the power transmitted through said planetary gear set.

9. In combination an unwinding spiral strip support, a winding support, means to drive both said supports and means to vary the relative speeds thereof, comprising a disengageable driving connection and a planetary gear set in the driving means for one of said supports and manually operable means to disengage said connection or increase the speed of transmission through said planetary gear set.

10. A driven turn table, a casing therefor, a gear box carrying the same, a support, said gear box being pivoted to said support, a link connecting said gear box to a part of said support adjustable to swing said box and turn table about said pivot and maintain said parts in adjusted position and means for guiding the strip as it leaves said casing and box positioned axially of said pivot.

11. Apparatus of the type described, which comprises an unwinding roll supporting plate having a number of arc shaped slots centered equidistant from the center of said plate and in approximate radial position; a number of supporting posts, one for each of said slots, extending through and slidable in said slots; a pair of parallel pivoted arms on said plate, one connected to said post; a link secured to said post and connected to the other of said parallel arms; a rotatable spider centered on said plate; and a number of links, one connecting said spider to one of each of said pairs of arms.

12. In a reeling mechanism, a driven winding reel, an unwinding device adapted to permit the unwinding of film from the inner portion of a film roll, transmission means for driving said unwinding device at a speed slightly less than that of said winding reel, manually actuated means for disconnecting said transmission through said transmission means, and means for automatically reconnecting said transmission upon the release of said manually actuated means.

13. In a reeling mechanism, a winding reel, an unwinding plate, means for clamping a film roll centrally on said unwinding plate, means for receiving film from the inner portion of said roll, driving means actuated from said winding reel and arranged to rotate said unwinding plate, means including separable clutch mechanisms for disengaging said unwinding plate from said transmission means, and means normally returning and holding said clutch mechanism normally in engaging position, whereby the unwinding plate may be adjusted at will relative to the winding reel.

14. In a reeling mechanism, a vertical winding reel, a train of gears driven by said reel and adapted to reduce the speed of rotation, a horizontal unwinding plate, a spindle supporting said plate, a vertical shaft geared to said gear train, a gear connection between said shaft and said supporting spindle, a clutch between said supporting spindle and said gear connection arranged to connect and disconnect said spindle from said gear connection, and resiliently acting means for holding and returning said clutch to connecting position.

15. In a reeling mechanism, a winding reel, a rotatable unwinding plate adapted to permit the film to be unwound from the inner portion of the film roll, means for driving said unwinding plate from said winding reel to give approximately equal linear speeds to the film leaving said unwinding plate and the film being wound on said reel, means for disengaging said unwinding plate from said reel to permit it to be independently rotated, manually operable means for disengaging said disengaging means, and means for returning said disengaging means to engaging position upon the release of said manually operable means.

16. In a reeling mechanism, a horizontal unwinding plate adapted to permit film to be taken from the interior of a film roll, a winding reel, a train of gears having a slightly decreasing gear ratio driven from said winding reel, a shaft driven by said gear train, a bevel gear and a vertical shaft driven by said gear shaft, a horizontal gear driven by said vertical shaft, a clutch plate adapted to rest on said horizontal gear and arranged to drive said unwinding plate, and means for lifting said clutch plate from said gear.

17. In a reeling mechanism, an unwinding plate adapted to permit film to be unwound from the interior of a film roll, a winding reel, a horizontal gear wheel, mechanism for transmitting motion from said winding reel to said gear at a slightly decreased speed, a clutch plate resting on said horizontal gear wheel and connected to drive said unwinding plate and having a downwardly extending spindle, a bell crank lever having one arm extending below said spindle and a cam arranged to be manually operated to move the other arm of said lever and lift said spindle and clutch plate.

18. In a reeling mechanism, an unwinding plate adapted to permit film to be unwound from the interior of a film roll, a winding reel, a horizontal gear wheel, mechanism for transmitting motion from said winding reel to said gear at a slightly decreased speed, a clutch plate resting on said horizontal gear wheel and connected to drive said unwinding plate and having a downwardly extending spindle, a lever having an arm bearing upwardly against the lower end of said spindle and manually operable means for tilting said lever and lifting said spindle and clutch plate.

19. In a reeling mechanism, an unwinding plate adapted to permit film to be unwound from the interior of a film roll, fingers slidable in a radial direction on said plate to grip the outer circumference of a film roll, levers pivoted on said plate and arranged to move said fingers, a central lever adapted to be manually operated, and links connecting said levers to said central lever in a manner to move said levers and fingers as the central lever is rotated.

20. In a reeling mechanism, an unwinding plate adapted to permit film to be unwound from the interior of a film roll, fingers slidable radially toward and away from the center of said plate, and adapted to grip the outer circumference of a film roll on said plate, levers pivoted on said plate and arranged to move said fingers, a central lever having an arm adapted to be manually operated, links connecting said levers to said central lever in a manner to cause said levers to be uniformly moved as said central lever is rotated, and means for holding said manually operated arm in a fixed position.

In testimony whereof, I affix my signature.

CHRISTIAN M. GOTTSCHAU.